United States Patent [19]

Holmes et al.

[11] 4,023,638
[45] May 17, 1977

[54] DRIVE LINE DISCONNECT MECHANISM

[75] Inventors: Donald E. Holmes, Clark Lake;
Wayne R. Howard, Jackson; John F. Fisher, Jackson; Burton S. Zeller, Jackson, all of Mich.

[73] Assignee: Clark Equipment Company, Buchanan, Mich.

[22] Filed: May 24, 1976

[21] Appl. No.: 689,227

[52] U.S. Cl. .................................. 180/14 B; 64/29
[51] Int. Cl.² ............................................. B60D 1/08
[58] Field of Search ............ 180/11, 12, 14, 53 R; 280/479 R, 479 A; 172/797; 64/29, 32; 192/70.27, 67 R

[56] References Cited

UNITED STATES PATENTS

| | | | |
|---|---|---|---|
| 2,390,908 | 12/1945 | Young | 64/29 |
| 2,894,775 | 7/1959 | Harless | 192/67 R X |
| 3,648,794 | 3/1972 | Clepper | 180/14 R |
| 3,703,089 | 11/1972 | Geisthoff | 64/32 |
| 3,831,693 | 8/1974 | King | 180/14 A |
| 3,934,667 | 1/1976 | Schwartz | 180/14 A |
| 3,961,677 | 6/1976 | Geisthoff | 180/14 B |

Primary Examiner—Joseph F. Peters, Jr.
Assistant Examiner—Terrance L. Slemens
Attorney, Agent, or Firm—Ernst H. Ruf

[57] ABSTRACT

A drive line disconnect mechanism for effecting rapid connection and disconnection of the drive line between a power module and the ground-engaging wheels of a work module, said modules being adapted to be joined together into an articulated modular vehicle. The drive line disconnect mechanism includes a first toothed coupling half mounted on a power module coupling member and a second toothed coupling half mounted on a work module coupling member wherein the second toothed coupling half is mounted so as to permit multi-planar pivotal movement relative to the first toothed coupling half. Centering means permit initial alignment and biasing means thereafter permit driving engagement.

14 Claims, 4 Drawing Figures

DRIVE LINE DISCONNECT MECHANISM

The invention herein described was made in the course of or under a contract with the Department of Defense.

BACKGROUND OF THE INVENTION

1. Field Of The Invention

The field of art to which this invention pertains includes a drive line disconnect mechanism that is particularly suited for drivably connecting and disconnecting the confronting coupling members of a modular vehicle which can be separated into a power module and a work module, particularly where it is desired to power to drivable wheels of the work module via the drive means of the power module.

2. Description Of The Prior Art

U.S. Pat. Nos. 3,563,329 and 3,891,003 are illustrative of the modular vehicle power modules and work modules for which the mechanism of the present invention may be advantageous. Since the apparatus for structurally coupling the two modules may afford articulation therebetween, the wheels of both modules maintain power driving contact with the ground at all times and permit the vehicle to maneuver and maintain traction on extremely rugged and irregular terrains. It is desirable to use a common tractor or power module with a variety of work modules, such as graders or scrapers for example, and in order to maintain maximum traction it is desired to drive the ground engaging wheels of the work modules.

While the structural coupling of the vehicle modules forms no part of the present invention, the dynamic coupling of the power module drive means with the ground engaging wheels of the work module have presented noticeable problems due to unavoidable misalignments between the modules that are bound to occur due to the stack-up of tolerances in the vehicle modules. Therefore, provisions must be made not only for proper alignment, but also that this alignment or centering is automatic and involves no operator skill, no unsafe mechanical adjustments and is substantially fool-proof in operation. Furthermore, the engagement or coupling of the work module drive line should not be automatic upon the structural coupling of the vehicle modules since such coupling could result in undesired movement of the work module. Typical prior art patents which are concerned with dynamic couplings include U.S. Pat. Nos. 2,390,908; 2,703,089; and 2,894,775. Further patents which deal with the dynamic coupling of articulated vehicles include U.S. Pat. Nos. 3,831,693 and 3,934,667.

SUMMARY OF THE INVENTION

This invention overcomes prior art difficulties by utilizing a drive line disconnect mechanism wherein a first toothed coupling half is rotatably mounted in a mid-mount bearing box that is attached to the coupling member of the power module. One end of this first toothed coupling half is drivably connected with the power module drive means.

A second toothed coupling half is rotatably mounted in a disconnect assembly that is attached to the work module coupling member and includes a support housing and a pivotable housing coaxial with and received within the support housing bore. The pivotable housing is pivotally connected with the support housing in a manner so as to permit a predetermined first amount of multi-planar pivotal movement of the distal end of the pivotable housing relative to the bore of the support housing. An input member, coaxial with the pivotable housing, has an open-ended hollow shaft portion extending into the pivotable housing bore and is rotatably journalled as well as axially slidable relative thereto. A closed end portion of the input member merges into opposed radially outwardly extending first flange portions. An output member, coaxial with and received within the pivotable housing as well as rotatably journalled relative thereto, has an externally splined bore portion in driving and axially slidable interconnection with the input member, with the output member being operatively connected with the drivable wheels of the work module.

A second toothed coupling half is concentric with the input member and has oppositely extending second flange portions adjacent to the first flange portions and interconnected therewith via a universal joint assembly so as to permit a limited second amount of multi-planar pivotal movement of the second coupling half with respect to the input member.

There are means for centering the second coupling half relative to the first coupling half, with biasing means biasing the second couplig half into driving engagement with the first coupling half. Disconnect means are used for selectively axially displacing the second coupling half in opposition to the biasing means for disconnecting the first and second toothed coupling halves as the modules are joined, with the first and second amounts of multi-planar pivotal movement combining with the centering means so as to take up unavoidable misalignments between the vehicle modules as the modules are coupled, so as to permit initial engagement of the first and second toothed coupling halves. After this initial coupling of the modules, subsequent action of the disconnect means thereafter permits the biasing means to bias the coupling halves into driving engagement.

Other features and advantages of this drive line disconnect mechanism will become more readily apparent by persons skilled in the art when following the detailed description in conjunction with the several drawings.

DESCRIPTION OF THE PREFERRED EMBODIMENT

Figure 1:
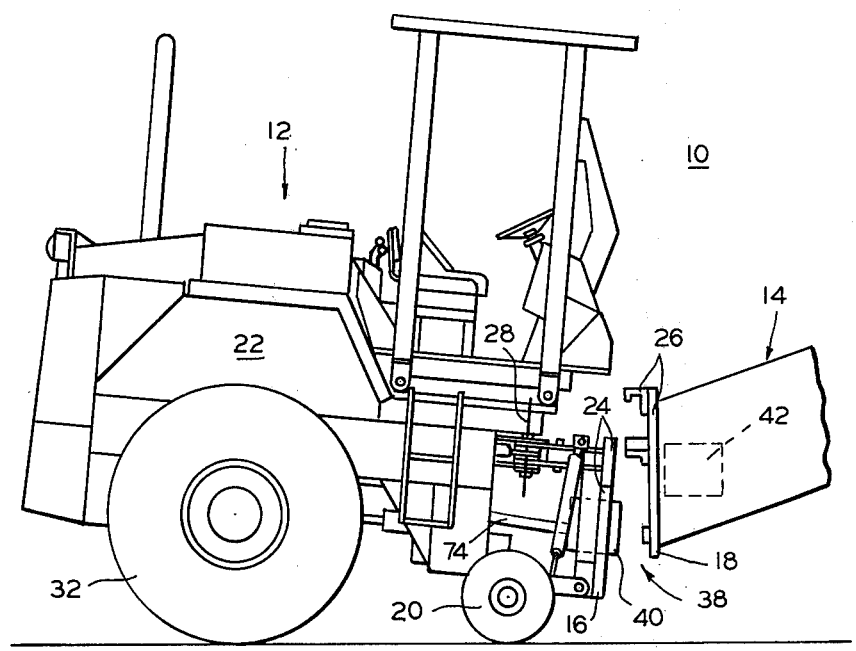
FIG. 1 is a schematic side elevational view showing a tractor module and a portion of an implement module, which together make up a complete articulated vehicle, with the tractor module and the implement module portion being shown disconnected from each other but in a condition so as to be ready for interconnection, with portions of the drive line disconnect mechanism of this invention being schematically represented in each of the modules.
Figure 3:
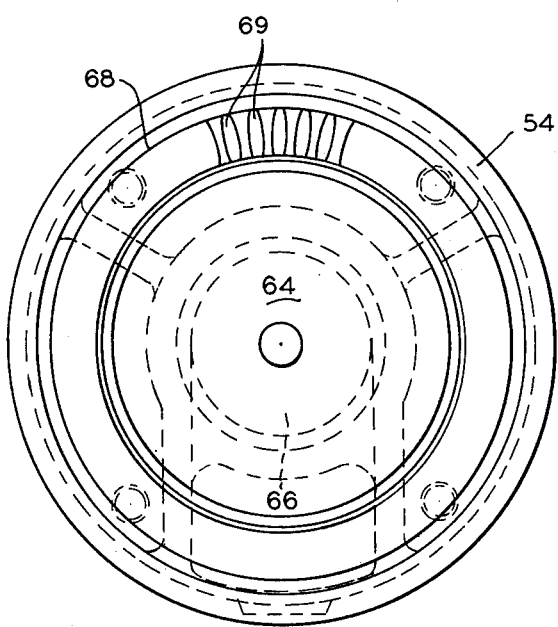
FIG. 3 is a simplified sectional view taken along line 3—3 of FIG. 2.

Referring now to the drawings in detail, FIG. 1 shows a portion of an articulated modular vehicle which is indicated generally by the numeral 10 and is composed of two separable parts, a tractor or power module indicated by the numeral 12 and an implement or work module, only a portion of which is shown, indicated by the numeral 14. The implement or work module may take any desired form, such as for example a grader implement or a scraper implement, which when coupled with the tractor or power implement, makes a complete articulated vehicle for movement of soil etc. either by pushing or by pulling in a manner illustrated in U.S. Pat. No. 3,891,003.

Tractor module 10 and implement module 14 are detachably secured together in any suitable manner such as by means of bolts (not shown) through the coupling plate or member 16 on the power module and coupling plate or member 18 on the work module. FIG. 1 shows power module 12 detached from work module 14, and when thus detached, the power module is supported on auxiliary wheels 20. Auxiliary wheels 20 are utilized to maneuver the power module for connection to the work module and after such connection has been accomplished, auxiliary wheels 20 are retracted. For more information on the manner in which the auxiliary wheels are utilized, reference should be made to U.S. Pat. No. 3,563,329.

Power module coupling plate 16 includes a plurality of top and side edges which are designed to mate with a plurality of top and side brackets on work module coupling plate 18 in a manner so that coupling plates 16 and 18 physically abut and lie in common vertical planes. For more information on the manner in which such coupling can be accomplished, reference should be made to U.S. Pat. No. 3,854,542.

Power module coupling plate 16 also includes a central opening 30 (FIG. 2) which is utilized for the location of a portion of the drive means for the mechanical drive of the wheels on the work module when four wheel drive is required. The illustrated power module only has two wheel drive, which is by wheels 32 (only one of which is visible). Similarly, work module coupling plate 18 is also provided with a central opening 34 (FIG. 2) which is utilized for the location of a further portion of the drive means for the mechanical drive of the wheels on work module 14. It should be understood that the coupling of the power and work modules via coupling plates 16 and 18, as best seen in FIG. 1, is shown for illustrative purposes only, forms no part of the present invention, and is merely shown to show the environment in which the drive line disconnect mechanism of the present invention may find application.

Figure 2:
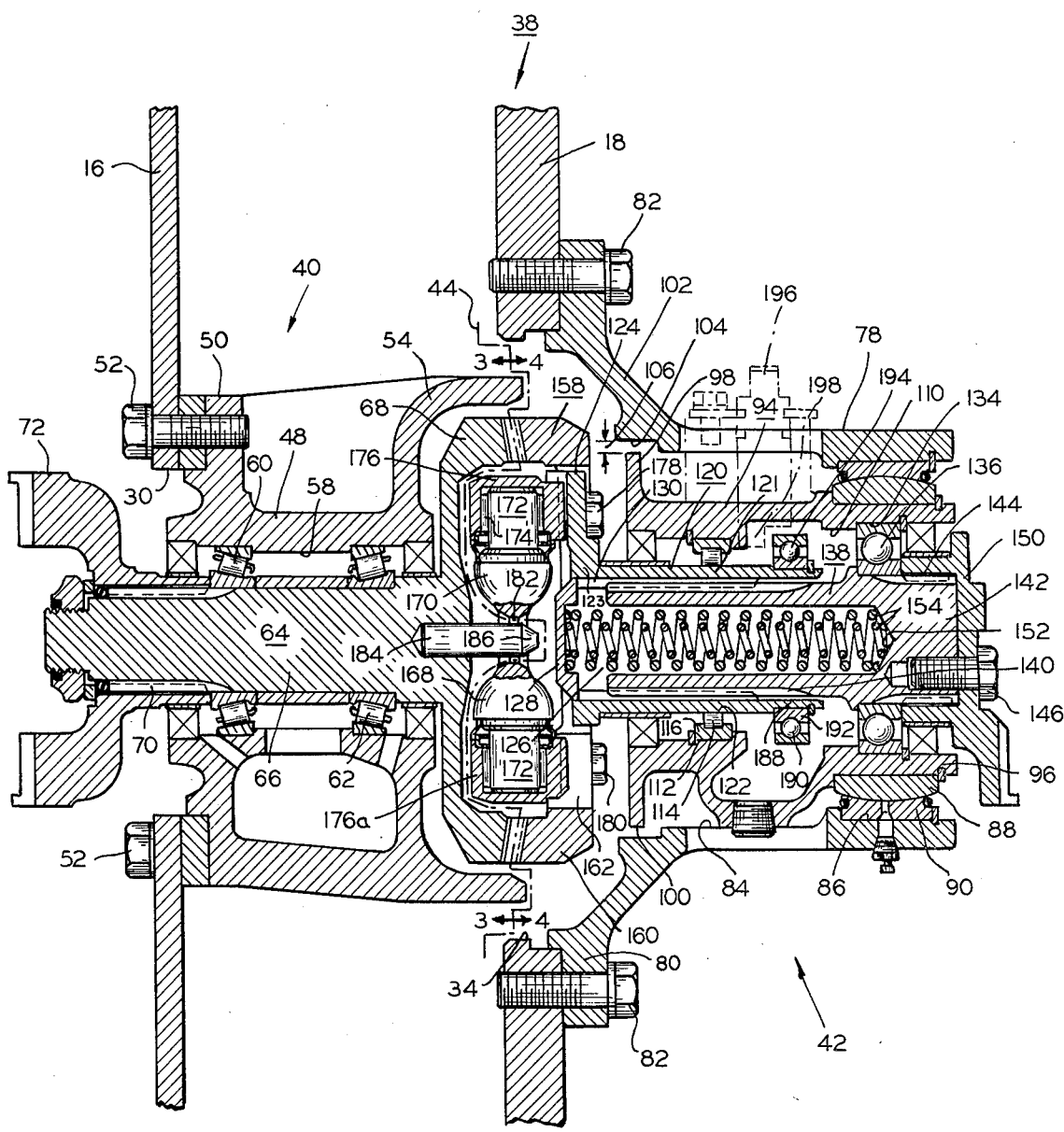
FIG. 2 is a sectional view showing the drive line disconnect mechanism of this invention in its connected position.

The drive line disconnect mechanism of this invention is indicated generally by the numeral 38 (FIG. 2) which in turn is composed of two main portions, namely a rotatable toothed coupling half 64 that is supported in a mid-mount bearing box 40 and a pivotable toothed coupling half 158 that is supported in a disconnect assembly 42. As schematically shown in FIG. 1, mid-mount bearing box 40 is attached to power module 12 or more specifically to power module coupling plate 16 as shown in FIG. 2. It will be appreciated that coupling plate 16, together with mid-mount bearing box 40, is pivotally connected to main body portion 22 of the power module to pivot about a vertically disposed axis 28 under control of the operator. Thus, when power module 12 is disconnected from a work module and is supported on its main drive wheels 32 and auxiliary wheels 20, the operator can maneuver the tractor module by pivoting the front connecting portion of the tractor module, including coupling plate 16 from side to side in order to steer the power module as it is propelled by an engine and drive line of any known construction which are embodied in power module 12, and thus maneuver coupling plate 16 relative to coupling plate 18.

As schematically shown in FIG. 1, disconnect assembly 42 is attached to work module 14 and more specifically, attached to work module coupling plate 18 as shown in FIG. 2. The schematic showing of FIG. 1 shows mid-mount bearing box 40 as separated from disconnect assembly 42, whereas FIG. 2 shows bearing box 40 and assembly 42 operatively interconnected with this interconnection occurring basically along tortuous line 44 in FIG. 2.

Mid-mount bearing box 40 takes the form of a housing 48 whose inner end merges into a flange portion 50 that is bolted to power module coupling plate 16 by bolts 52. The outer end of housing 48 terminates in a bowl-shaped flange portion 54, with housing 48 also having a central longitudinal bore 58. Rotatably journalled in bore 58, by spaced tapered roller bearings 60 and 62, is shaft portion 66 of rotatable toothed coupling half 46 which also includes an integral disc-like portion 68 which has a plurality of radially extending teeth 69. Rotatable toothed coupling half 64 may take the form of one-half of a Curvic coupling, with the term "Curvic" being the subject of a trademark registration issued to Gleason Works of Rochester, N.Y., covering clutches. As will be discussed in more detail later, these toothed or Curvic couplings basically take the form of two disc-like members which have intermeshing and cooperating teeth, which members, upon engagement, act as a coupling element for the transfer of torque. While the outer end of shaft portion 66 merges into disc-like portion 68, the inner end of shaft portion 66 is connected, via spline connection 70, with a flange half 72, whose other half is connected to a drive shaft 74 (FIG. 1) that is driven by the prime mover that also powers tractor module 12. As best seen in FIG. 2, disc-like portion 68 of rotatable coupling half 64 is received within bowl-shaped flange portion 54 of housing 48.

Turning now to disconnect assembly 42, as best seen in FIG. 2, it includes a support housing 78 whose outer end includes a flange portion 80 that is bolted to work module coupling plate 18 by bolts 82. Support housing 78 is also provided with a stepped longitudinal bore 84, an inner or distal end portion 86 of which serves to physically retain the outer race portion 90 of spherical bearing 88, with the latter being physically secured on an inner portion 96 of pivotable housing 94 contained in support housing stepped bore 84. The outer end of pivotable housing 94 terminates in a radial or distal flange 98 whose peripheral outer surface 100 is able to contact, as will be explained later, the inner peripheral surface 104 of stepped bore portion 102 of support housing 78 by reason of the pivoting of housing 94 relative to housing 78. FIG. 2 shows the median position of housing flange 98 relative to bore portion 102, with numeral 106 representing one-half of the maximum multi-planar pivotal movement between surfaces 100 and 104.

Pivotable housing 94 has a stepped longitudinal inner bore 110, a portion 112 of which serves to physically retain the outer race 116 of roller bearing 114 whose rollers bear directly on the outer peripheral surface 122 of disconnect input hollow shaft or member 120. Input member shaft portion 121 extends into stepped bore 110 of pivotable housing 94 and is rotatably journalled relative thereto via bearing 114. The outer or closed end 123 of input member 120 merges into opposed radial flange portions 124 (best seen in FIG. 4) whereas its central bore 126 is closed off near its outer end by a cap member 128 and its inner peripheral surface is provided with splines 130.

Also rotatably mounted, via bearing 136, affixed to bore portion 134 of pivotable housing 94, is disconnect output shaft or member 138 which partially extends into central bore 126 of disconnect input shaft 120 and has its external splines 140 intermeshed with splines 130 of input shaft 120 thus forming a driving and axially slidable interconnection therebetween. The inner end portion 142 of output member 138 is connected to a flange half 150 via spline connection 144 and bolts 146 (only one of which is shown). Flange half 150 is adapted to be joined to a similar flange half (not shown) that is mounted on a further portion of the drive means (not shown) for the mechanical drive of the wheels on work module 14.

Disconnect output member 138 has a blind bore portion 152 which is open toward central bore 126 of disconnect input shaft 120, with bore portion 152 cooperating with sleeve member central bore 126 and cap member 128 to confine one or more concentric biasing springs 154 whose function will be described in more detail hereinafter.

Figure 4:
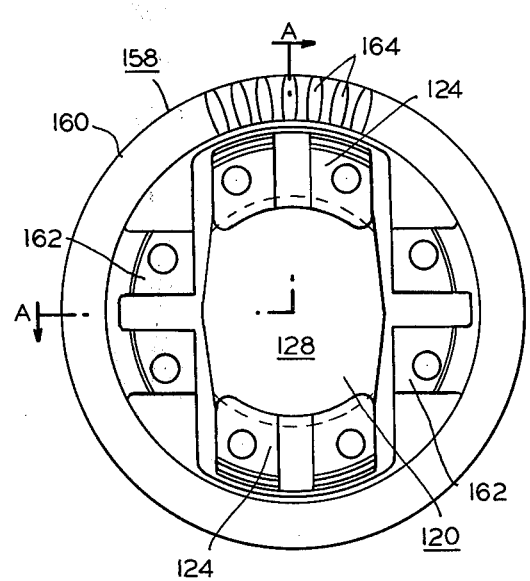
FIG. 4 is a simplified sectional view taken along line 4—4 of FIG. 2.

As best seen in FIGS. 2 and 4, flange portions 124 of disconnect input shaft 120 are surrounded by pivotable toothed coupling half 158, preferably in the form of a Curvic coupling half, which includes a disc-like portion 160, has opposed internal flange portions 162 and spaced radial teeth 164 that are adapted to be aligned with and intermesh with radial teeth 69 of rotatable coupling half 64. Thus, coupling halves 64 and 158 basically take the form of two disc-like portions or members 68 and 160, respectively, which have intermeshing and cooperating teeth 69 and 164.

Forming the connection between pivotable coupling half 158 and disconnect input shaft 120 is a universal joint or cross and bearing assembly 168 which may, for example, take the form of a Mechanics 7-C assembly made by the Mechanics Universal Joint Division of Borg-Warner Corporation in Chicago, Ill. Cross and bearing assembly 168 is made up of a cross member 170, each of whose outer ends 172 is provided with needle bearings 174 and a cap member 176 in a manner well known in the art. As best seen in FIGS. 2 and 4, two opposed cap members 176 are rigidly fastened to input shaft flange portions 124 by bolts 178 whereas the remaining opposed cap members 176a are rigidly bolted to opposed internal flange portions 162 of pivotable coupling half 158 by bolts 180, thus permitting a limited amount of multi-planar pivotal movement between coupling half 158 and disconnect input shaft 120. The connection, as shown in FIG. 2, between cap members 176 and each of flange portions 124, 162, can best be understood by viewing Section A—A in FIG. 4, since it is generally this section that is shown in FIG. 2. It should be noted that, contrary to the normal use of a universal joint assembly, all four bearing cap members 176 face in one direction. This not only saves space by reducing the axial extent thereof but also permits coupling teeth 69 and 164 to be located close to the centerline of cross member 170. Cross member 170 is also provided with a central aperture 182, with aperture 182 permitting the insertion of a portion of a locating or centering pin 184 which is affixed to shaft portion 66 of rotatable coupling half 64, extends into the center of disc-like portion 68, and has a locating ramp 186 on the outer end thereof.

It should be understood at this time that pivotable coupling half 158 is axially movable, relative to rotatable coupling half 64, by reason of the connection via universal cross and bearing assembly 168 between pivotable coupling half 158 and disconnect input shaft 120 since the latter is axially movable relative to disconnect output member 138. It is the function of biasing springs 154, acting against cap member 128, to bias pivotable coupling half 158 into engagement with rotatable coupling half 64. It should also be understood that while disconnect input shaft 120 is rotatably journalled, via roller bearing 114 (with reference to pivotable housing 94), shaft 120 is also axially movable relative to housing 94 since the rollers of bearing 114 are in direct contact with outer peripheral surface 122 of input shaft 120 so that there can be sliding movement therebetween.

As best seen in FIG. 2, an inner end portion 188 of disconnect input shaft 120 physically retains the inner race 192 of a bearing 190 while the outer race 194 thereof can be contacted by cam portion 198 of a rotatable disconnect bar 196 (shown out of true position) that extends through support housing 72 and pivotable housing 94. The rotation of disconnect bar 196, either manually or through a power assist, will cause interaction between cam portion 198 and bearing outer race 194 which in turn causes axial translation of disconnect input shaft 120 in opposition of the bias of springs 154 and subsequent disengagement of teeth 164 of pivotable coupling half 158 from teeth 69 of rotatable coupling half 64, thus interrupting the drive connection therebetween.

As previously described, and best shown in FIGS. 1 and 2, drive line disconnect mechanism 38 which is made up of rotatable toothed coupling half 64 (mounted in mid-mount bearing box 40 that is attached to power module coupling plate 16), and pivotable toothed coupling half 158 (mounted in disconnect assembly 42 that is attached to work module coupling plate 18). Mid-mount bearing box 40 and disconnect assembly 42 mate, along line 44 (FIG. 2) by the intermeshing of teeth 69 and 164 of toothed coupling halves 64 and 158, respectively. The coupling of drive line disconnect mechanism 38 will now be described, assuming that power module 12 and work module 14 are separated, in the manner shown in FIG. 1 and that disconnect bar 196 has been rotated so as to axially translate disconnect input shaft and consequently pivotable coupling half 158 to its disconnect position. Power module 12 is maneuvered into coupling position relative to work module 14 and the modules are coupled via plates 16 and 18. The coupling of the two modules will, however, not couple mid-mount bearing box 40 is disconnect assembly 42 since pivotable coupling half 158 is biased to its disconnect position by disconnect bar 196. As previously noted, coupling half 64 is rotatable about its longitudinal axis but fixed against axial movement since it is its function to take up drive shaft thrust loads. In contrast thereto, coupling half 158 can rotate and move axially relative to housing 94 as well as pivot with housing 94 relative to support housing 78 by virtue of spherical bearing 88, with the maximum amount of pivotal movement being twice the distance represented by numeral 106. In addition thereto, coupling half 158 can pivot relative to input shaft 120 by reason of the universal joint connection, via universal cross and bearing assembly 168 between coupling flange portions 162 and disconnect input shaft flange portions 124. Thus, coupling half 158 has several degrees of freedom in that it can pivot about its vertical and horizontal axes, i.e., it can pivot about its center point by reason of its universal joint connection with disconnect input shaft 120. At the same time, input shaft 120 can pivot relative to the center of spherical bearing 88 and thus permit a further limited degree of pivotal movement of coupling half 158. These movements permit coupling half 158 of disconnect assembly 42 to take up or make up for unavoidable misalignments between power module 12 and work module 14 which are bound to occur due to the stack-up of tolerances in the two vehicle modules.

When modules 12 and 14 are coupled, and even though coupling half 158 is in its disconnect position, locating ramp 186 of centering pin 184 will start to locate and at least partially slide into central aperture 182 in cross member 170. Thus, after modules 12 and 14 are coupled, rotation of disconnect bar 196 permits bias springs 154 to axially displace coupling half 158 into mating relationship with coupling half 64 by virtue of their intermeshing teeth 69 and 164, respectively.

The basic concept behind drive line disconnect mechanism 38 is to permit a driving interconnection between power module 12 and work module 14 and for taking up any misalignment between the vehicle modules. The mounting of work module coupling half 158 on universal joint 168 in combination with spherical bearing 88, together with locating pin 184 and cross aperture 182 helps to initially align coupling halves 64 and 158. Thereafter, the bias of springs 154, helps to initially couple the coupling halves and keep them coupled.

It should be understood that drive line disconnect mechanism 38 is utilized when there is in-line transfer of torque through the drive line disconnect mechanism, i.e., when flange halves 72 and 150 are axially aligned. All the operator has to do, after the initial coupling of the vehicle modules, is to initiate the axial translation, via disconnect bar 196, of coupling half 158 relative to coupling half 64. No actual manual connection or operator-induced centering is required.

It should readily be apparent that drive line disconnect mechanism 38 provides a substantially self-engaging mechanism that requires no operator skill, no unsafe mechanical adjustments by the operator and is substantially fool-proof in operation.

From the foregoing, it is believed that those familiar with the art will recognize and appreciate the novel concepts and features of the present invention. Obviously, while the invention has been described in relation to only a single embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What is claimed is:

1. In a modular vehicle which is separable into a power module having drive means as well as drivable wheels and a work module having drivable wheels, said modules being adapted to be joined together via confronting opposed coupling members attached to said power and work modules, respectively, a drive line disconnect mechanism comprising:
   a. a first toothed coupling half rotatably mounted in a midmount bearing box attached to said power module coupling member, with one end of said first coupling half being adapted to be drivably connected with said power module drive means; and
   b. a second toothed coupling half rotatably mounted in a disconnect assembly attached to said work module coupling member, said disconnect assembly including:
      1. a support housing attached to said work module coupling member and having a central bore;
      2. a pivotable housing coaxial with and received within said support housing bore and pivotally connected with said support housing in a manner so as to permit a predetermined first amount of multi-planar pivotal movement of the distal end of said pivotable housing relative to the bore of said support housing with said pivotable housing having a central bore;
      3. an input member coaxial with said pivotable housing and having a hollow shaft with a longitudinally splined bore closed on one end, with an open end portion of said hollow shaft extending into said pivotable housing central bore and being rotatably journalled as well as axially slidably mounted relative thereto, with the closed end portion of said input member merging into opposed radially outwardly extending first flange portions that are axially spaced from said pivotable housing;
      4. an output member coaxial with and received within said pivotable housing bore and rotatably journalled relative to said pivotable housing, with said output member having an externally splined bore portion thereof extending into and intermeshing with the splined bore of said input member thus forming a driving and axially slidable interconnection therebetween, said output member being adapted to be operatively connected with the drivable wheels of said work module;
      5. said second toothed coupling half being concentric with said input member, said second coupling half having opposed radially inwardly extending second flange portions adjacent to said first flange portions, said second flange portions being connected with said first flange portions via a universal joint assembly, thereby permitting a limited second amount of multi-planar pivotal movement of said second coupling half with respect to said input member;
      6. means for centering said second coupling half relative to said first coupling half;
      7. biasing means for biasing said input member and second coupling half into driving engagement with said first coupling half; and
      8. disconnect means for selectively axially displacing said second coupling half in opposition to said biasing means for disconnecting said first and second toothed coupling halves as said modules are joined, said first and second amounts of multi-planar pivotal movement combining with said means for centering so as to take up unavoidable misalignments between said vehicle modules as said modules are coupled and permitting initial alignment of said first and second toothed coupling halves, with subsequent actuation of said disconnect means thereafter permitting the biasing means to bias said coupling halves into driving engagement.

2. The drive line disconnect mechanism of claim 1 wherein said pivotable housing is connected with said support housing by means of a spherical bearing interposed between the distal end of said support housing and an adjacent outer peripheral surface portion of said pivotable housing.

3. The drive line disconnect mechanism of claim 1 wherein said universal joint assembly takes the form of a cross and bearing assembly having a first set of opposed bearing cap members attached to said first flange portions and a second set of opposed bearing cap members attached to said second flange portions with said first and second sets of bearing cap members facing in the same direction.

4. The drive line disconnect mechanism of claim 3 wherein said means for centering includes a locating pin, having a locating ramp on one end thereof, attached to said first toothed coupling half, said pin being adapted to cooperate with a central aperture in said cross and bearing assembly.

5. The drive line disconnect mechanism of claim 1 wherein said disconnect means includes a rotatable disconnect bar, extending normally through said support and pivotable housings, whose inner end is provided with a cam portion, with said cam portion, upon rotation of said disconnect bar, being adapted to connect a portion of a rotatable means, journalled on a distal end of said input member, and thereby axially displacing said input member in a direction opposing said biasing means.

6. In a modular vehicle which is separable into a power module having drive means as well as drivable wheels and a work module having drivable wheels, said modules being adapted to be joined together via confronting opposed coupling members attached to said power and work modules, respectively, a drive line disconnect mechanism comprising a mid-mount bearing box, attached to said power module coupling member, having a first toothed coupling half rotatably mounted therein, with one end of said first coupling half being adapted to be drivably connected with said power module drive means; and a disconnect assembly, attached to said work module coupling member, said disconnect assembly including:

a. a support housing attached to said work module coupling member and having a longitudinal bore;

b. a pivotable housing coaxial with and received within said support housing bore and pivotally connected with said support housing by means of a pivotable support means interposed between the distal end of said support housing bore and an adjacent outer peripheral surface portion of said pivotable housing in a manner so as to permit a predetermined first amount of multi-planar pivotal movement of the distal end of said pivotable housing relative to the bore of said support housing with said pivotable housing having a central longitudinal bore;

c. a disconnect input member coaxial with said pivotable housing and having a hollow shaft with a longitudinally splined bore closed on one end, with an open end portion of said hollow shaft extending into said pivotable housing longitudinal bore and being rotatably journalled as well as axially slidably mounted relative thereto by bearing means interposed between said pivotable housing central bore and an adjacent outer peripheral surface portion of said hollow shaft, with the closed end portion of said disconnect input member extending into said support housing longitudinal bore and merging into opposed radially outwardly extending first flange portions;

d. a disconnect output member received within said pivotable housing bore and rotatably journalled by means of bearing means interposed between the portion of said pivotable housing bore underlying said pivotable support means and an adjacent outer peripheral surface portion of said disconnect output member, with the latter having an externally splined blind bore portion thereof extending into and intermeshing with the splined bore of said input member thus forming a driving and axially slidable interconnection therebetween, said output member being adapted to be operatively connected with the drivable wheels of said work module;

e. a second toothed coupling half concentric with said input member, said second coupling half having opposed radially inwardly extending second flange portions adjacent to said first flange portions, said second coupling half being connected with said input member via a universal cross and bearing assembly having a first set of opposed bearing cap members attached to said first flange portions and a second set of opposed bearing cap members attached to said second flange portions, thereby permitting a limited second amount of multi-planar pivotal movement of said second coupling half with respect to said input member;

f. means for centering said second coupling half relative to said first coupling half;

g. biasing means, cooperating with said input and output members, for biasing said input member and second coupling half into driving engagement with said first coupling half; and h. disconnect means cooperating with said support housing and input member for selectively axially displacing said input member and second coupling half in opposition to said biasing means for disconnecting said first and second toothed coupling halves as said modules are joined, said first and second amounts of multi-planar pivotal movement combining with said means for centering so as to take up unavoidable misalignments between said vehicle modules as said modules are coupled so as to permit initial alignment of said first and second toothed coupling halves, with subsequent actuation of said disconnect means causing said biasing means to thereafter bias said coupling halves into driving engagement and allowing the drivable connection of said work module drive wheels with said power module drive means.

7. The drive line disconnect mechanism of claim 6 wherein said means for centering includes a locating pin, having a locating ramp on one end thereof, attached to said first toothed coupling half, said pin being adapted to cooperate with a central aperture in said universal cross and bearing assembly.

8. The drive line disconnect mechanism of claim 6 wherein said biasing means takes the form of one or more biasing springs in the bores of said input and output members.

9. The drive line disconnect mechanism of claim 6 wherein said disconnect means includes a rotatable disconnect bar, extending through said support and pivotable housings, whose inner end is provided with a cam portion, with said cam portion, upon rotation of said disconnect bar, being adapted to contact a portion of a rotatable means, journalled on the distal end of said input member, and thereby axially displacing said input member in a direction opposing said biasing means.

10. The drive line disconnect mechanism of claim 6 wherein said first toothed coupling half includes a coaxial shaft portion, one end of which is adapted to be operatively connected, via a flange member mounted thereon, with said power module drive means.

11. The drive line disconnect mechanism of claim 6 wherein said output member is adapted to be operatively connected, via a flange member mounted on one end thereof, with the drivable wheels of said work module.

12. The drive line disconnect mechanism of claim 6 wherein said pivotable support means takes the form of a spherical bearing.

13. The drive line disconnect mechanism of claim 6 wherein said first and second sets of bearing cap members of said cross and bearing assembly face in the same direction.

14. The drive line disconnect mechanism of claim 6 wherein said first and second toothed coupling halves are provided with pluralities of opposed generally radially extending teeth that are adapted to cooperate and intermesh upon engagement of said coupling halves.

* * * * *